(12) United States Patent
Zhang et al.

(10) Patent No.: US 11,733,433 B2
(45) Date of Patent: Aug. 22, 2023

(54) PROTECTIVE FILM FOR SUBSTRATE, MANUFACTURING METHOD THEREOF, SUBSTRATE AND MANUFACTURING METHOD OF DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yu Zhang, Beijing (CN); Hao Yan, Beijing (CN); Haitao Yi, Beijing (CN); Zhenghong Wang, Beijing (CN); Zhiliang Jiang, Beijing (CN)

(73) Assignees: 1) CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 817 days.

(21) Appl. No.: 16/333,818

(22) PCT Filed: Sep. 7, 2018

(86) PCT No.: PCT/CN2018/104604
§ 371 (c)(1),
(2) Date: Mar. 15, 2019

(87) PCT Pub. No.: WO2019/148845
PCT Pub. Date: Aug. 8, 2019

(65) Prior Publication Data
US 2021/0341650 A1    Nov. 4, 2021

(30) Foreign Application Priority Data

Feb. 5, 2018 (CN) .................. 201810110481.X

(51) Int. Cl.
*G02B 1/14* (2015.01)
*G09F 9/30* (2006.01)
(Continued)

(52) U.S. Cl.
CPC .................. *G02B 1/14* (2015.01); *B32B 3/30* (2013.01); *B32B 27/08* (2013.01); *G09F 9/301* (2013.01); *B32B 2457/20* (2013.01)

(58) Field of Classification Search
None
See application file for complete search history.

(56) References Cited

U.S. PATENT DOCUMENTS

2016/0093683 A1* 3/2016 Lee .................. G06F 1/1618
257/40
2016/0306460 A1* 10/2016 Lee .................. H01L 27/323
(Continued)

FOREIGN PATENT DOCUMENTS

| CN | 106910428 A | 6/2017 |
| CN | 107104200 A | 8/2017 |

(Continued)

OTHER PUBLICATIONS

International Search Report dated Nov. 15, 2018 issued in corresponding International Application No. PCT/CN2018/104604.
(Continued)

*Primary Examiner* — Anthony J Frost
(74) *Attorney, Agent, or Firm* — Nath, Goldberg & Meyer; Joshua B. Goldberg

(57) ABSTRACT

The present disclosure provides a protective film for a substrate, a manufacturing method thereof, a substrate and a manufacturing method of a display panel. The substrate includes a plurality of panel regions correspondingly forming a plurality of display panels. Each of the panel regions has a first region corresponding to a bending region of the
(Continued)

display panels. The protective film includes a entire film layer and a hollow portion, the size of the entire film layer matches the size of the substrate, and the hollow portion is for exposing the first region in each of the panel regions when the protective film is attached to the substrate.

15 Claims, 2 Drawing Sheets

(51) Int. Cl.
  *B32B 3/30* (2006.01)
  *B32B 27/08* (2006.01)

(56) References Cited

U.S. PATENT DOCUMENTS

| | | | |
|---|---|---|---|
| 2017/0194365 A1* | 7/2017 | Cai | H01L 27/1218 |
| 2018/0175311 A1* | 6/2018 | Jin | H01L 27/3258 |
| 2019/0027708 A1 | 1/2019 | Kim | |

FOREIGN PATENT DOCUMENTS

| | | | | |
|---|---|---|---|---|
| CN | 107195802 A | | 9/2017 | |
| CN | 107359284 A | | 11/2017 | |
| CN | 107650484 | * | 2/2018 | ............. B32B 32/12 |
| CN | 107650484 A | | 2/2018 | |
| CN | 108172126 A | | 6/2018 | |
| JP | 2017083669 A | | 5/2017 | |

OTHER PUBLICATIONS

Office Action dated Dec. 25, 2018 issued in corresponding Chinese Application No. 201810110481.X.
Office Action dated May 22, 2019 issued in corresponding Chinese Application No. 201810110481.X.
Fourth Office Action dated Apr. 15, 2020 corresponding to Chinese application No. 201810110481.X.

* cited by examiner

PROTECTIVE FILM FOR SUBSTRATE, MANUFACTURING METHOD THEREOF, SUBSTRATE AND MANUFACTURING METHOD OF DISPLAY PANEL

TECHNICAL FIELD

The present disclosure relates to the field of display technology, in particular, to a protective film for a substrate, a manufacturing method thereof, a substrate and a manufacturing method of a display panel.

BACKGROUND

With the improvement of OLED technology, full screen technology is becoming a trend of development. In order to achieve a full screen, "Bending technology" is a key technology. In order to protect the flexible substrate, a protective film is usually attached to the back surface of the flexible substrate. However, since all the protective films are small in size and need to be attached one by one to the divided display panels, resulting in more attachment devices and lower attachment efficiency. There is also a problem that the removal of the protective film is incomplete, resulting in wrinkles of the flexible substrate when bent, thereby causing breakage of the traces.

SUMMARY

The present disclosure provides a protective film for a substrate, the substrate comprising a plurality of panel regions, the plurality of panel regions correspondingly forming a plurality of display panels, each of the panel regions having a first region, the first region corresponds to a bending region of each of the display panels, wherein the protective film comprises a entire film layer, and a hollow portion is disposed in the entire film layer, the size of the entire film layer matches the size of the substrate, and the hollow portion is for exposing the first region in each of the panel regions when the protective film is attached to the substrate.

In one embodiment, the hollow portion is a plurality of hollow portions; and each of the hollow portions corresponds to the first region in each of the panel regions in a one-to-one manner.

In one embodiment, when the protective film is attached to the substrate, an orthographic projection of each of the hollow portions on the substrate completely covers the corresponding first region, and a contour size of the orthographic projection of each of the hollow portions on the substrate is greater than the contour size of the first region.

In one embodiment, when the protective film is attached to the substrate, an orthographic projection of each of the hollow portions on the substrate completely coincides with a contour of the first region.

In one embodiment, the plurality of the panel regions are arranged in a matrix, and the first region in the panel regions arranged in the same row or in the same column constitute a continuous strip region; the hollow portions are arranged in a matrix, and each of the hollow portions has a strip shape, and when the protective film is attached to the substrate, the hollow portions expose the strip region in a one-to-one correspondence.

In one embodiment, when the protective film is attached to the substrate, an orthographic projection of each of the hollow portions on the substrate completely covers the corresponding strip region; and the size of the orthographic projection of each of the hollow portions on the substrate is greater than a contour size of the strip region.

In one embodiment, when the protective film is attached to the substrate, an orthographic projection of each of the hollow portions on the substrate completely coincident with a contour of the corresponding strip region.

In one embodiment, the size of the entire film layer in a longitudinal direction corresponding to the strip region is l, and the size of each of the hollow portions in the longitudinal direction is m, and l is equal to m.

In one embodiment, the protective film further comprises a first protective film that completely covers an attaching surface of the entire film layer.

In one embodiment, the substrate protective film further comprises a second protective film that completely covers a surface facing away from the attaching surface of the entire film layer.

The present disclosure also provides a manufacturing method of a protective film for a substrate, the substrate comprising a plurality of panel regions, the plurality of panel regions correspondingly forming a plurality of display panels, each of the panel regions having a first region, the first region corresponds to a bending region of each of the display panels, wherein the manufacturing method comprises: providing a entire film layer, the size of the entire film layer matches the size of the substrate; forming a hollow portion in the entire film layer, and the hollow portion is for exposing the first region in each of the panel regions when the protective film is attached to the substrate.

In one embodiment, the manufacturing method further comprises: forming a first protective film on an attaching surface of the entire film layer, and the first protective film completely covers the attaching surface.

In one embodiment, the manufacturing method further comprises: forming a second protective film on a surface facing away from the attaching surface of the entire film layer, the second protective film completely covers the surface facing away from the attaching surface.

In one embodiment, a punching method is applied to form the hollow portion in the entire film layer, and the punching method comprises: providing a mold, the mold having an occlusion region and a non-occlusion region; placing the mold on the entire film layer; punching the entire film layer through the non-occlusion region of the mold by using a punching tool to remove portions of the entire film layer corresponding to the non-occlusion region, so as to form the hollow portion.

The present disclosure also provides a substrate, a plurality of display panels disposed on the substrate, and a protective film disposed on a surface of the substrate facing away from the display panel, wherein the protective film is the above-mentioned substrate protective film provided in the present disclosure.

As another technical solution, the present disclosure also provides a manufacturing method of a display panel, comprising: providing a substrate, the substrate comprising a plurality of panel regions; forming a plurality of display panels correspondingly in each of the panel regions of the substrate; wherein each of the panel regions has a first region, and the first region corresponds to a bending region of each of the display panels; providing a protective film for the substrate, the protective film comprising a entire film layer, the size of the entire film layer matching the size of the substrate; forming a hollow portion in the entire film layer, the hollow portion for exposing the first region in each of the panel regions when the protective film is attached to the substrate; attaching the entire film layer to a surface of the substrate facing away from the display panels; and cutting the substrate to form the plurality of display panels that are independent from each other.

DETAILED DESCRIPTION OF THE EMBODIMENTS

In order to enable those skilled in the art to better understand the technical solutions of the present disclosure, a protective film for a substrate, a manufacturing method thereof, a substrate and a manufacturing method of a display panel provided in the present disclosure are described in detail below with reference to the accompanying drawings.

Figure 1:
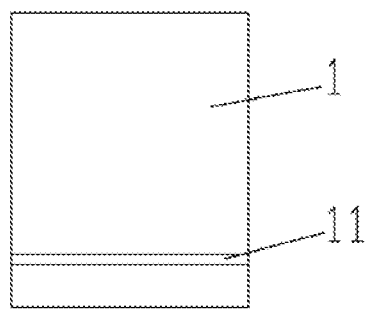
FIG. 1 is a structural view of a protective film in the related art.

Currently, a large-sized flexible substrate is usually cut into a plurality of small-sized display panels. There are two main ways of attaching a protective film. As shown in FIG. 1, the first way is to apply a small-sized protective film 1 corresponding to the display panel. The protective film 1 has a hollow portion 11, and the hollow portion 11 corresponds to the bending region when the protective film 1 is attached to the display panel. The second way is to attach a small-sized protective film to the display panel, and then burn the region of the protective film corresponding to the bending region to remove the region thereof. However, since the protective films in the above two methods are all small in size, they need to be attached one by one to the divided display panels, resulting in more attachment devices and lower attachment efficiency. Moreover, for the second way above, there is also a problem that the removal of the protective film is incomplete, resulting in wrinkles of the flexible substrate when bent, thereby causing breakage of the traces.

Figure 2:
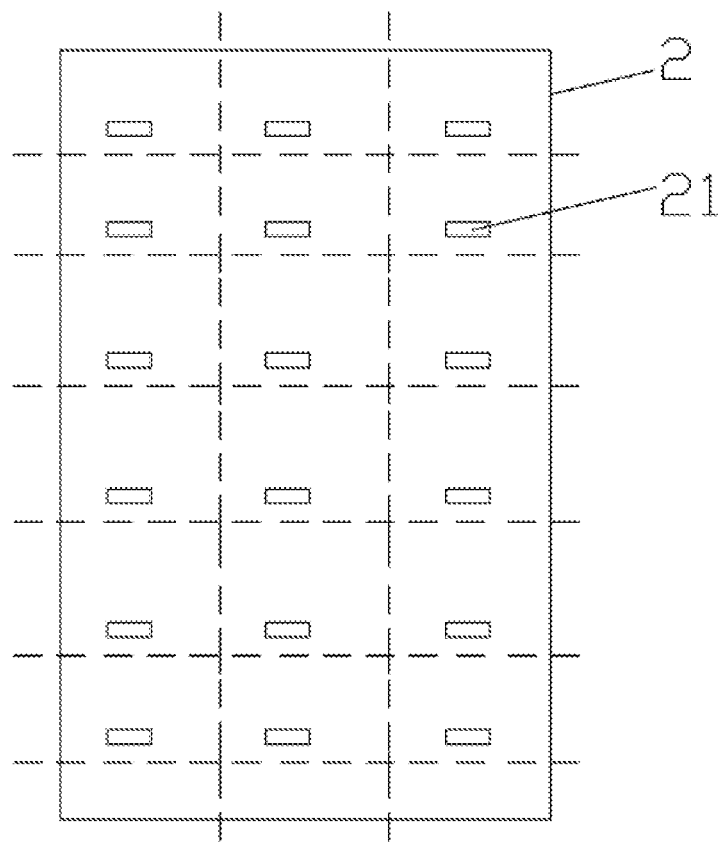
FIG. 2 is a structural view of a substrate protective film according to a first embodiment of the present disclosure.

Referring to FIG. 2, a first embodiment of the present disclosure provides a protective film (substrate protective film) for a substrate. The substrate is protected by attaching the protective film to the back surface of the substrate. The substrate is, for example, a flexible substrate. The substrate is usually of a large size, and by cutting a large-sized substrate, a plurality of independent small-sized display panels can be obtained. Particularly, the substrate includes a plurality of panel regions, the plurality of panel regions correspondingly form a plurality of display panels; and each of the panel regions has a first region. The first region corresponds to a bending region of each of the display panels. In this embodiment, the plurality of the panel regions are arranged in a matrix. Herein, "arrange in a matrix" means an arrangement that the rows and columns are arranged. In addition, the cutting can be, but is not limited to, a laser cutting method.

The substrate protective film includes an entire film layer 2 having a size that matches the size of the substrate. "The size of the entire film layer 2 matches the size of the substrate" means that the shape and size of the entire film layer 2 are substantially the same as the shape and size of the substrate. The broken line in FIG. 2 indicates positions of corresponding substrate cutting lines of the substrate protective film. The substrate is divided by the substrate cutting lines to form respective panel regions with small sizes.

In addition, a hollow portion 21 is disposed in the entire film layer 2, and the hollow portion 21 is for exposing the first region in each of the panel regions A when the substrate protective film is attached to the substrate.

By matching the size of the entire film layer 2 to the size of the substrate, the entire film layer 2 can be attached to the uncut large-sized substrate first, so that the attachment efficiency can be improved. At the same time, by providing the hollow portion 21 in the entire film layer 2 before the attachment, it is possible to avoid the presence of the protective film at the bending region, so that the wrinkles can be avoided when the substrate is bent.

In this embodiment, the hollow portion 21 is a plurality of hollow portions; and each of the hollow portions 21 corresponds to the first region in each of the panel regions in a one-to-one manner. Alternatively, when the substrate protective film is attached to the substrate, an orthographic projection of each of the hollow portions 21 on the substrate completely coincides with a contour of the corresponding bending region. In this way, it is ensured that the protective film is not present in the bending region, so that the wrinkles can be avoided when the substrate is bent. Definitely, in practical applications, the orthographic projection of each of the hollow portions 21 on the substrate can completely cover the first region corresponding thereto, and a contour size of the orthographic projection of each of the hollow portions 21 on the substrate is greater than the contour size of the first region. Thereby, even if there is a certain tolerance in the cutting process for forming the hollow portion, it is ensured that the entire film layer having been cut does not cover the first region in the panel region. The contour size herein refers to at least one of the dimension parameters of a specific contour. Taking a rectangle as an example, the contour size is a long-side size and/or a short-side size of the rectangle.

Figure 3:
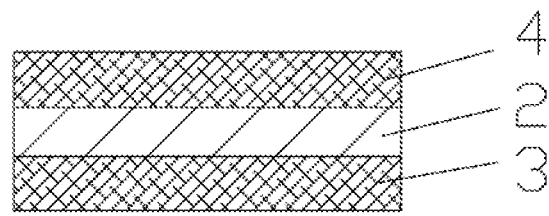
FIG. 3 is a cross-sectional view of the substrate protective film according to the first embodiment of the present disclosure.

In this embodiment, as shown in FIG. 3, the substrate protective film further includes a first protective film 3 that completely covers an attaching surface of the entire film layer 2. As shown in FIG. 3, the first protective film 3 completely covers the lower surface of the entire film layer 2 for protecting the attaching surface of the entire film layer 2 before being attached. The attaching surface refers to the surface of the entire film layer 2 that is attached to the substrate.

In this embodiment, the substrate protective film further includes a second protective film 4 that completely covers a surface of the entire film layer 2 facing away from the above-mentioned attaching surface. When the entire film layer 2 is attached to the substrate, the attaching surface of the entire film layer 2 is attached to the substrate, and the second protective film 4 is located on the side of the entire film layer 2 away from the substrate, so as to protect the entire film layer 2. Also, the second protective film 4 can be removed and only the entire film layer 2 is retained according to the needs of the specific process.

The substrate protective film provided in the second embodiment of the present disclosure is substantially the same as the substrate protective film provided in the first embodiment described above, except that the structure of the hollow portion is different.

Figure 4:
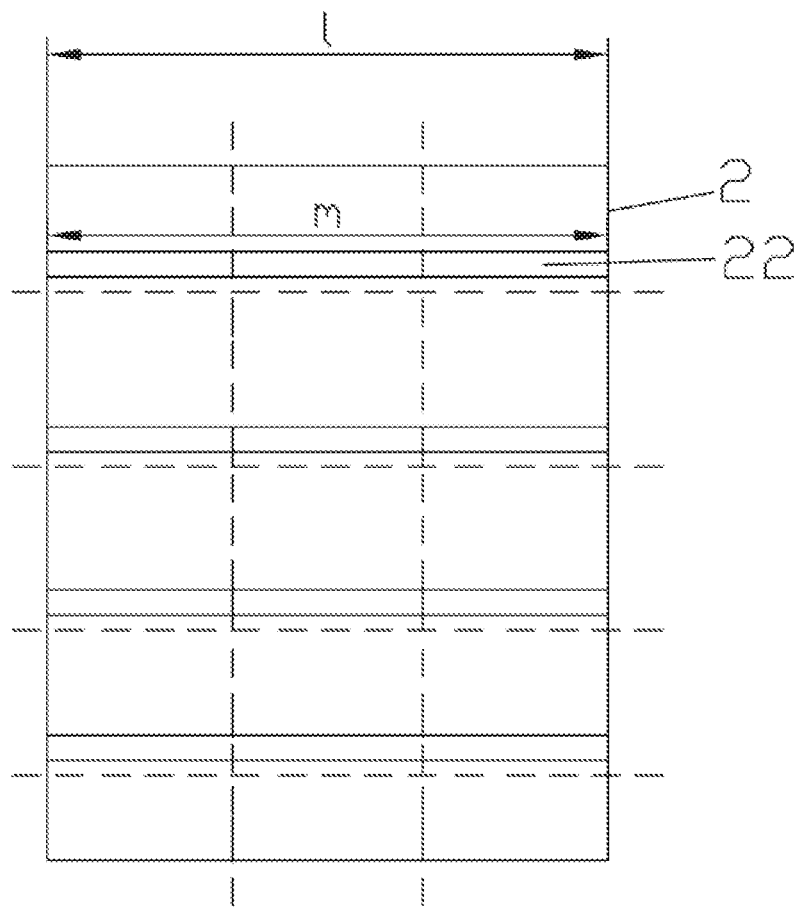
FIG. 4 is a structural diagram of a substrate protective film according to a second embodiment of the present disclosure.

Particularly, as shown in FIG. 4, the plurality of the panel regions are arranged in a matrix; and the first region in the panel regions arranged in the same row or in the same column constitute a continuous strip region. The plurality of hollow portions 22 disposed in the entire film layer 2 are arranged in a matrix, and each of the hollow portions 22 has a strip shape. When the protective film is attached to the substrate, the hollow portions 22 expose the strip region in a one-to-one correspondence. That is, one hollow portion 22 can expose a strip region composed of the first region of the panel regions in the same one row (or column). In this way, the structure of the hollow portion 22 can be simplified, so that the process difficulty can be reduced.

Alternatively, the orthographic projection of each of the hollow portions 22 on the substrate completely coincident with a contour of the corresponding strip region (bending region) of the panel regions in the same one row (or column). In this way, it is ensured that the protective film is not present in the bending region, so that the wrinkles can be avoided when the substrate is bent. Definitely, in practical applications, when the substrate protective film is attached to the substrate, the orthographic projection of each of the hollow portions on the substrate may also completely cover the corresponding strip region, and a contour size of the orthographic projection of each of the hollow portions on the substrate is greater than the contour size of the strip region. As a result, the process difficulty can be reduced, and the influence on the dimensions caused by tolerances in the process can be eliminated.

In this embodiment, the size of the entire film layer 2 in a longitudinal direction (the left and right direction as shown in FIG. 4) corresponding to the strip region is l, and the size of each of the hollow portions 22 in the longitudinal direction is m, and l is equal to m. In this way, the structure of the hollow portion 22 can be simplified, so that the process difficulty can be reduced.

As another technical solution, the present disclosure also provides a manufacturing method of a protective film for a substrate. The substrate includes a plurality of panel regions, the plurality of panel regions correspondingly form a plurality of display panels, each of the panel regions has a first region, the first region corresponds to a bending region of each of the display panels, and each of the panel regions has a bending region. As shown in FIG. 2, the manufacturing method includes: providing a entire film layer 2, the size of the entire film layer 2 matches the size of the substrate; forming a hollow portion 21 in the entire film layer 2, and the hollow portion 21 is for exposing the first region in each of the panel regions when the substrate protective film is attached to the substrate.

By matching the size of the entire film layer 2 to the size of the substrate, the entire film layer 2 can be attached to the uncut large-sized substrate first, so that the attachment efficiency can be improved. At the same time, by providing the hollow portion 21 in the entire film layer 2 before the attachment, it is possible to avoid the presence of the protective film at the bending region, so that the wrinkles can be avoided when the substrate is bent.

Alternatively, a punching method is applied to form the hollow portion 21 in the entire film layer 2. The punching method includes: providing a mold, the mold has an occlusion region and a non-occlusion region; placing the mold on the entire film layer 2; punching the entire film layer through the non-occlusion region of the mold by using a punching tool to remove portions of the entire film layer corresponding to the non-occlusion region, so as to form the hollow portion 21.

It is easy to understand that the occlusion region of the above mold covers the entire film layer 2, and the non-occlusion region does not cover the entire film layer 2. The fabrication of the hollow portion 21 can be accomplished by punching the portion of the entire film layer 22 that is not covered by the mold, so that the fabrication of the plurality of hollow portions 21 can be accomplished in a single process.

Alternatively, as shown in FIG. 3, the manufacturing method further includes: forming a first protective film 3 on an attaching surface of the entire film layer 2, and the first protective film 3 completely covers the attaching surface. The first protective film 3 is used to protect the attaching surface of the entire film layer 2 before it is attached. The attaching surface refers to the surface of the entire film layer 2 that is attached to the substrate.

Alternatively, as shown in FIG. 3, the manufacturing method further includes: forming a second protective film 4 on a surface facing away from the attaching surface of the entire film layer 2, the second protective film 4 completely covers the surface facing away from the attaching surface.

When the entire film layer 2 is attached to the substrate, the attaching surface of the entire film layer 2 is attached to the substrate, and the second protective film 4 is located on the side of the entire film layer 2 away from the substrate, so as to protect the entire film layer 2. Also, the second protective film 4 can be removed and only the entire film layer 2 is retained according to the needs of the specific process.

As another technical solution, the present disclosure also provides a substrate, a plurality of display panels disposed on the substrate, and a protective film disposed on a surface of the substrate facing away from the display panel, the protective film is the substrate protective film provided in the present disclosure.

The present disclosure provides a substrate with above protective film provided in the present disclosure, not only can the attachment efficiency be improved, but also can the presence of the protective film at the bending region be avoided, so that the wrinkles can be avoided when the flexible substrate is bent.

As another technical solution, as shown in FIG. 2, the present disclosure also provides a manufacturing method of a display panel, including: providing a substrate, the substrate including a plurality of panel regions; forming a plurality of display panels correspondingly in each of the panel regions of the substrate; wherein each of the panel regions has a first region, and the first region corresponds to a bending region of each of the display panels; providing a protective film for the substrate, the protective film including a entire film layer 2, the size of the entire film layer 2 matching the size of the substrate; forming a hollow portion 21 in the entire film layer 2, the hollow portion 21 for exposing the first region in each of the panel regions when the protective film is attached to the substrate; attaching the entire film layer 2 to a surface of the substrate facing away from the display panels; and cutting the substrate to form the plurality of display panels that are independent from each other.

In summary, the disclosure provides a protective film for a substrate, a manufacturing method thereof, a substrate and a manufacturing method of a display panel, in which the substrate protective film includes a entire film layer, and a hollow portion is disposed in the entire film layer, the size of the entire film layer matches the size of the substrate, and the hollow portion is for exposing the first region in each of the panel regions when the protective film is attached to the substrate. By matching the size of the entire film layer to the size of the substrate, the entire film layer can be attached to the uncut large-sized substrate first, so that the attachment efficiency can be improved. At the same time, by providing the hollow portion in the entire film layer before the attachment, it is possible to avoid the presence of the protective film at the bending region, so that the wrinkles can be avoided when the substrate is bent.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A protective film for a substrate, the substrate comprising a plurality of panel regions, wherein the substrate is to be cut into a plurality of independent small-sized display panels which correspond to the plurality of panel regions, respectively, each of the panel regions having a first region, the first region corresponds to a bending region of each of the display panels, wherein
the protective film comprises an entire film layer, and a hollow portion is disposed in the entire film layer, the size of the entire film layer matches the size of the substrate, and the hollow portion is for exposing the first region in each of the panel regions when the protective film is attached to the substrate,
wherein the plurality of the panel regions are arranged in a matrix, each row and each column in the matrix includes a plurality of panel regions, and the first region in the panel regions arranged in the same row or in the same column constitute a continuous strip region;
the hollow portions are arranged in a matrix, and each of the hollow portions has a strip shape, and when the protective film is attached to the substrate, the hollow portions expose the strip region in a one-to-one correspondence, and a portion of the protective film between two adjacent hollow portions forms a one-piece structure configured to cover the plurality of panel regions arranged in a direction parallel to the hollow portion.

2. The protective film according to claim 1, wherein the hollow portion is a plurality of hollow portions; and each of the hollow portions corresponds to the first region in each of the panel regions in a one-to-one manner.

3. The protective film according to claim 2, wherein when the protective film is attached to the substrate, an orthographic projection of each of the hollow portions on the substrate completely covers the corresponding first region, and a contour size of the orthographic projection of each of the hollow portions on the substrate is greater than the contour size of the first region.

4. The protective film according to claim 2, wherein when the protective film is attached to the substrate, an orthographic projection of each of the hollow portions on the substrate completely coincides with a contour of the first region.

5. The protective film according to claim 1, wherein when the protective film is attached to the substrate, an orthographic projection of each of the hollow portions on the substrate completely covers the corresponding strip region; and the size of the orthographic projection of each of the hollow portions on the substrate is greater than a contour size of the strip region.

6. The protective film according to claim 1, wherein when the protective film is attached to the substrate, an orthographic projection of each of the hollow portions on the substrate completely coincident with a contour of the corresponding strip region.

7. The protective film according to claim 1, wherein the size of the entire film layer in a longitudinal direction corresponding to the strip region is 1, and the size of each of the hollow portions in the longitudinal direction is m, and 1 is equal to m.

8. The protective film according to claim 1, wherein the protective film further comprises a first protective film that completely covers an attaching surface of the entire film layer.

9. The protective film according to claim 8, wherein the protective film further comprises a second protective film that completely covers a surface facing away from the attaching surface of the entire film layer.

10. A manufacturing method of a protective film for a substrate, wherein the substrate is to be cut into a plurality of independent small-sized display panels which correspond to the plurality of panel regions, respectively, each of the panel regions having a first region, the first region corresponds to a bending region of each of the display panels, wherein the manufacturing method comprises:
providing an entire film layer, the size of the entire film layer matches the size of the substrate;
forming a hollow portion in the entire film layer, and the hollow portion is for exposing the first region in each of the panel regions when the protective film is attached to the substrate,
wherein the plurality of the panel regions are arranged in a matrix, each row and each column in the matrix includes a plurality of panel regions, and the first region in the panel regions arranged in the same row or in the same column constitute a continuous strip region;
the hollow portions are arranged in a matrix, and each of the hollow portions has a strip shape, and when the protective film is attached to the substrate, the hollow portions expose the strip region in a one-to-one correspondence, and a portion of the protective film between two adjacent hollow portions forms a one-piece structure configured to cover the plurality of panel regions arranged in a direction parallel to the hollow portion.

11. The manufacturing method according to claim 10, wherein the manufacturing method further comprises:
forming a first protective film on an attaching surface of the entire film layer, and the first protective film completely covers the attaching surface.

12. The manufacturing method according to claim 11, wherein the manufacturing method further comprises:
forming a second protective film on a surface facing away from the attaching surface of the entire film layer, the second protective film completely covers the surface facing away from the attaching surface.

13. The manufacturing method according to claim 10, wherein a punching method is applied to form the hollow portion in the entire film layer, and the punching method comprises:
providing a mold, the mold having an occlusion region and a non-occlusion region;
placing the mold on the entire film layer;
punching the entire film layer through the non-occlusion region of the mold by using a punching tool to remove portions of the entire film layer corresponding to the non-occlusion region, so as to form the hollow portion.

14. A substrate, a plurality of display panels disposed on the substrate, and a protective film disposed on a surface of the substrate facing away from the display panel, wherein the protective film is according to claim 1.

15. A manufacturing method of a display panel, comprising:
- providing a substrate, the substrate comprising a plurality of panel regions;
- forming a plurality of display panels correspondingly in each of the panel regions of the substrate; wherein each of the panel regions has a first region, and the first region corresponds to a bending region of each of the display panels;
- providing a protective film for the substrate, wherein the protective film is the protective film according to claim 1;
- attaching the entire film layer to a surface of the substrate facing away from the display panels; and
    - cutting the substrate to form the plurality of display panels that are independent from each other.

\* \* \* \* \*